United States Patent [19]

Rangwala

[11] Patent Number: 4,462,436

[45] Date of Patent: Jul. 31, 1984

[54] FILLER MEANS FOR CHARGING CONTAINERS

[75] Inventor: Badruddin K. Rangwala, Farmington Hills, Mich.

[73] Assignee: Ex-Cell-O Corporation, Troy, Mich.

[21] Appl. No.: 423,777

[22] Filed: Sep. 27, 1982

[51] Int. Cl.³ ............................................. B67C 3/02
[52] U.S. Cl. .................................... 141/250; 222/493
[58] Field of Search ................ 141/255, 31, 392, 264, 141/250, 260, 263; 222/188, 571, 493; 137/237, 246, 247, 248; 251/12

[56] References Cited

U.S. PATENT DOCUMENTS

| | | | |
|---|---|---|---|
| 509,647 | 11/1893 | Beardsley et al. | 141/250 X |
| 2,107,987 | 2/1938 | Johnson | 141/255 |
| 3,285,300 | 11/1966 | Mistarz | 141/392 |

Primary Examiner—Stephen Marcus
Assistant Examiner—Mark Thronson
Attorney, Agent, or Firm—John P. Moran

[57] ABSTRACT

This disclosure illustrates and describes a filler valve assembly including a fluid pressure-activated upper control valve, a spring for urging the control valve closed, a fixed lower flow control valve, a nozzle slidably mounted in the lower end of the valve body, a second spring for normally urging the nozzle into a capillary seal relationship with the lower flow control valve, and spacer means extending between the nozzle and the upper control valve. Upon receiving a measured volume of fluid under pressure from an external source, the upper control valve is opened, causing the nozzle to move relative to the fixed lower flow control valve and thereby discharge a measured volume of fluid product into a container therebelow.

8 Claims, 1 Drawing Figure

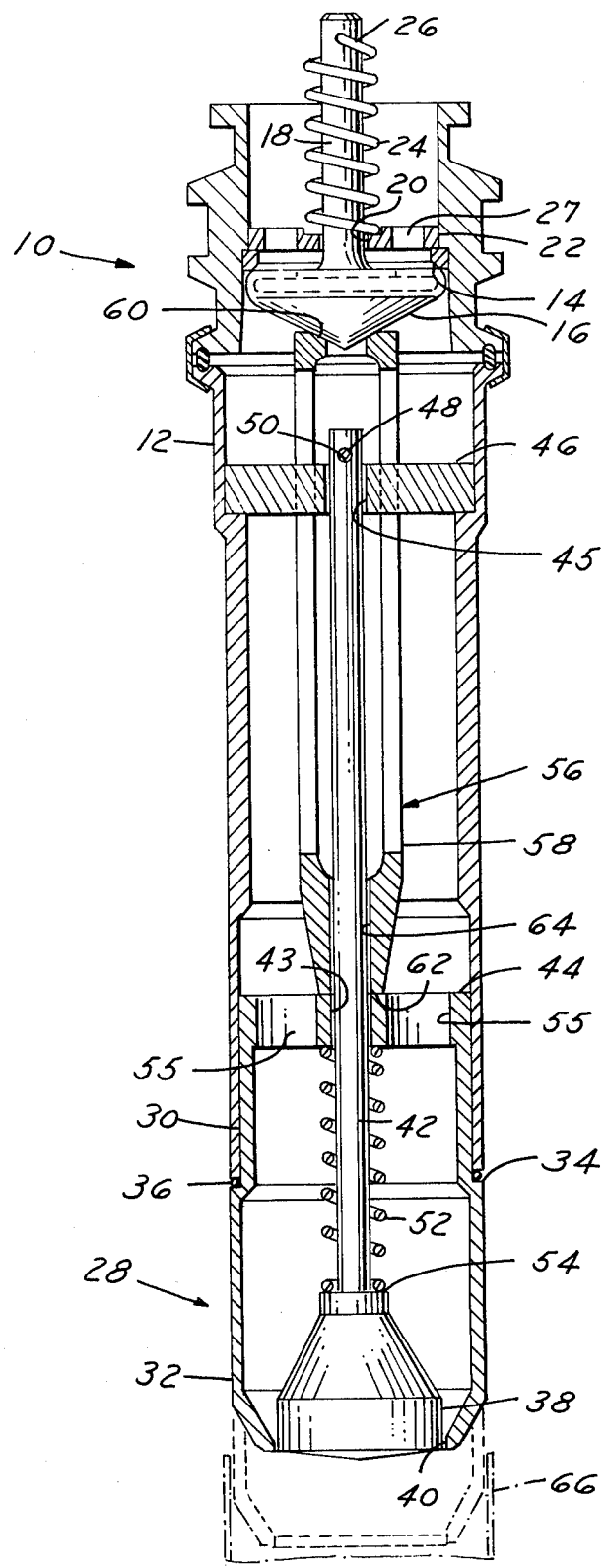

FILLER MEANS FOR CHARGING CONTAINERS

TECHNICAL FIELD

This invention relates generally to filler valve assemblies for liquids and, more particularly, to a filler valve unit wherein the lower body or nozzle portion thereof is actuated by a movable upper control valve for vertical movement relative to a fixed lower flow control valve.

BACKGROUND ART

Heretofore, container filler mechanisms have generally been either fixedly disposed above an open-top container, or lowered as a unit in order to insert the nozzle thereof downwardly into a container so as to progressively fill the latter as the unit is retracted therefrom.

DISCLOSURE OF THE INVENTION

A general object of the invention is to provide an improved filler valve unit wherein only the nozzle portion thereof is movable into an open-top container positioned immediately therebelow.

Another object of the invention is to provide a filler valve unit, including a fluid pressure-actuated upper control valve, a fixed lower flow control valve, a nozzle slidably mounted in the lower end of the valve body for cooperation with the lower flow control valve, and extension means for lowering and raising the nozzle in response to movement of the upper control valve to discharge fluid into a container positioned therebelow.

These and other objects and advantages will become more apparent when reference is made to the following description and accompanying drawings.

BRIEF DESCRIPTION OF THE DRAWINGS

The FIGURE is a side cross-sectional view of a filler valve assembly embodying the invention.

BEST MODE OF CARRYING OUT THE INVENTION

Referring now to the drawings in greater detail, the figure illustrates a filler valve assembly 10 including a valve body 12 having a frusto-conical shaped valve seal 14 formed on an inner surface thereof. A control valve 16 including a valve stem 18 extended upwardly through an opening 20 formed in the center of a fixed spring retainer member 22 is slidably mounted in the body 12. The valve 16 is normally urged into contact with the seat 14 by suitable resilient means, such as a spring 24 mounted between the upper surface of the retainer member 22 and a connection 26 adjacent the upper end of the stem 18. A plurality of circumferentially spaced openings 27 are formed through the retainer member 22.

A lower valve body or nozzle 28 includes an upper half 30 slidably mounted in the lower end of the valve body 12, and a lower half 32 extending beyond the latter, with a shoulder 34 formed between the halves 30 and 32. An O-ring seal 36 is mounted around the upper half 30, providing seal means between the shoulder 34 and the lower end of the body 12.

A flow control valve 38 is mounted for cooperation with an opening 40 formed at the bottom edge of the lower half 32 when the latter is in its uppermost position. The valve 38 includes a valve stem 42 extending upwardly therefrom, through a central opening 43 formed in a combination guide and abutment member 44 formed at the top of the upper half 30 of the valve body 28, and thence on up through the center of the valve body 12, terminating just above an opening 45 formed in a guide bar 46 mounted transversely within the latter. A pin 48 mounted through a transverse opening 50 formed adjacent the end of the stem serves to cooperate with the guide bar 46 to retain the valve stem 42 and valve 38 in a fixed position. Suitable resilient means, such as a spring 52, is mounted around the stem 42 between the underside of the abutment member 44 and a shoulder 54 formed at the top of the flow control valve 38. A plurality of circumferentially spaced openings 55 are formed through the member 44.

An extension or spacer member 56 serves to extend between the upper control valve 16 and the abutment portion of the member 44. The extension member 56 is formed to include a plurality of vertical ribs 58 having an abutment seat 60 formed at the top thereof for contact with the control valve 16 and an abutment surface 62 at the bottom thereof for engagement with the abutment member 44. An opening 64, formed through the lower end of the member 56, permits the latter to move vertically relative to the valve stem 42. The ribs 58 extend past the guide bar 46.

OPERATION

Once the liquid to be dispensed by the filler valve assembly 10 is communicated thereto by cooperating external pump means (not shown), the valve bodies 12 and 28 remain filled between cycles when the lower body 28 is in the position shown in the figure, by virtue of capillary action between the flow control valve 38 and the opening 40. By capillary action is meant that a narrow annular space exists between the adjacent surfaces of the flow control valve 38 and the opening 40 when the control valve 16 is closed, but due to the surface tension of the liquid adjacent thereto, the liquid is retained within the lower valve body 28 without leakage through the narrow annular space. Upon receiving each successive measured volume of liquid under pressure from the external source of supply (not shown) into the upper end of the body 12, an equal volume of liquid is discharged thorugh the valve outlet 38/40. This occurs in the following manner:

The incoming liquid is forced through the openings 27 against the valve 16, urging it away from the seat 14 against the force of the springs 24 and 52, to thereby push against standing liquid within the valve bodies 12 and 28. As the valve 16 is moved downwardly, it pushes the extension member 56 downwardly, which in turn moves the abutment member 44 and, hence, the lower valve body 28 downwardly, as shown in phantom in the figure, to thereby free the opening 40 and discharge a measured volume of liquid therethrough in a converging type of flow pattern into a container, represented at 66. Once the pressure against the upper valve 16 subsides, the spring 24 urges the valve 16 back into contact with the seat 14, while the spring 52 urges the shoulder 34 of the slidable valve body 28 back into contact with the 0-ring seal 36. Thus, the full column of liquid within the bodies 12 and 28 is once again retained therein by the capillary action between the valve 38 and the opening 40.

INDUSTRIAL APPLICABILITY

It should be apparent that the invention provides a highly efficient filler valve arrangement which is capable of meeting the fast production requirements of today's conventional forming, filling and sealing machines.

While but one embodiment of the invention has been shown and described, other modifications thereof are possible.

The embodiments of the invention in which an exclusive property or privilege is claimed are defined as follows:

1. A filler valve assembly for filling containers with liquid products, said filler valve assembly comprising a main body, a lower valve body slidably mounted in the lower end portion of the main body, an upper valve seat formed in said main body, an upper control valve, first resilient means for urging said upper control valve into contact with said upper valve seat, an inlet into said main body upstream of said upper control valve, a flow control valve fixedly secured in said main body so as to extend into said lower valve body, second resilient means for urging said lower body into a sealing relationship with said flow control valve, and extension means connected between said upper control valve and said lower valve body while retaining said flow control valve in a fixed position, for lowering said lower valve body relative to said flow control valve upon opening movement of said upper control valve in response to a measured volume of incoming fluid under pressure past said upper control valve to thereby discharge a measured volume of fluid product.

2. The filler valve assembly described in claim 1, wherein said sealing relationship is a capillary seal type relationship.

3. The filler valve assembly described in claim 1, and a perforated abutment member formed on the upper end of said lower valve body.

4. The filler valve assembly described in claim 3, wherein said extension means is a spacer member extending between said abutment member and said upper control valve.

5. The filler valve assembly described in claim 3, wherein said second resilient means is mounted between said abutment member and said fixed lower flow control valve.

6. The filler valve assembly described in claim 4, and a transverse guide bar secured in said main body.

7. The filler valve assembly described in claim 6, and a valve stem extending upwardly from said lower control valve, through said abutment member to said guide bar, and fastener means for securing the upper end of said stem and said guide bar.

8. The filler valve assembly described in claim 6, wherein said spacer member includes circumferentially spaced vertical rib members extending past said guide bar.

* * * * *